(12) United States Patent
Hiley et al.

(10) Patent No.: US 8,230,820 B2
(45) Date of Patent: Jul. 31, 2012

(54) DIP CUP

(75) Inventors: Richard James Hiley, Chinnor (GB); Ian Cross, Finstock (GB)

(73) Assignee: Ambic Equipment Limited, Witney Oxfordshire (GB)

( * ) Notice: Subject to any disclaimer, the term of this patent is extended or adjusted under 35 U.S.C. 154(b) by 34 days.

(21) Appl. No.: 12/585,669

(22) Filed: Sep. 21, 2009

(65) Prior Publication Data

US 2010/0083903 A1    Apr. 8, 2010

Related U.S. Application Data

(63) Continuation-in-part of application No. PCT/GB2008/050206, filed on Mar. 20, 2008.

(51) Int. Cl.
*A01K 29/00* (2006.01)

(52) U.S. Cl. ........................................................ 119/670

(58) Field of Classification Search .............. 119/14.47, 119/670, 14.01, 14.18, 652, 673; 239/343; 222/207, 211, 190
See application file for complete search history.

(56) References Cited

U.S. PATENT DOCUMENTS

| | | | | |
|---|---|---|---|---|
| 3,622,049 A * | 11/1971 | Thompson | ................ | 222/190 |
| 3,713,423 A * | 1/1973 | Sparr, Sr. | ................ | 119/670 |
| 4,305,346 A * | 12/1981 | Sparr, Sr. | ................ | 119/670 |
| 5,379,724 A * | 1/1995 | Dee et al. | ................ | 119/673 |
| 5,535,700 A * | 7/1996 | Boudreau | ................ | 119/651 |
| 6,302,058 B1 * | 10/2001 | Dahl et al. | ................ | 119/14.47 |
| 7,178,480 B2 * | 2/2007 | Dahl et al. | ................ | 119/14.47 |
| 7,753,006 B2 * | 7/2010 | Hiley | ................ | 119/673 |
| 2005/0208148 A1 | 9/2005 | Dahl et al. | | |

FOREIGN PATENT DOCUMENTS

| | | |
|---|---|---|
| EP | 1 224 858 | 7/2002 |
| GB | 2 299 011 | 9/1996 |
| GB | 2 395 435 | 5/2004 |
| WO | WO 2006/033131 | 3/2006 |

OTHER PUBLICATIONS

International Preliminary Report on Patentability dated Jun. 16, 2009 for PCT/GB2008/050206.
International Search Report for PCT/GB2008/050206 mailed Jul. 21, 2008.
Written Opinion for PCT/GB2008/050206 mailed Jul. 21, 2008.

* cited by examiner

*Primary Examiner* — T. Nguyen
(74) *Attorney, Agent, or Firm* — Nixon & Vanderhye P.C.

(57) ABSTRACT

A dip cup 10 comprises a cup 12 for receiving a teat, the cup 12 being connected or connectable to a supply of teat treating liquid including a foaming agent, foaming elements 34, 36 for mixing air and the teat treating liquid to produce foam, and a regulator device 16 for setting an air-to-liquid ratio. The regulator device 16 is selectable or adjustable based on the teat treating liquid, so that a specified air-to-liquid ratio is achieved.

17 Claims, 4 Drawing Sheets

DIP CUP

This application is a Continuation-In-Part of International Application No. PCT/GB2008/050206, filed 20 Mar. 2008, which designated the U.S. and claims priority of British Application No. 0705478.6, filed 22 Mar. 2007, the entire contents of each of which are all hereby incorporated herein by reference.

The present invention relates to a dip cup for treating bovine teats, typically with a disinfecting teat-treating liquid.

Dip cups are known. One example is suggested in G132299011 A. This describes the use of foam, instead of liquid, as a method of reducing chemical use and for providing a more uniform and longer lasting disinfecting process.

However, through research, it has been determined that this type of dip cup rarely provides a correct ratio of air-to-liquid chemical. if too much air is mixed with the liquid, the foam is too dry, leading to an insufficient amount of chemical coming into contact with the teat. Conversely, if too little air is mixed with the foam, too much chemical is imparted to the teat, leading to wastage and an increase in cost. This matter is further complicated in that different teat-treating liquids require different, but specific, air-liquid mixing ratios.

A further problem exists in that the known dip cup is difficult to dismantle for cleaning. This is an essential requirement, due to the relatively harsh and dirty environment in which the dip cup is used.

The known dip cup also has numerous small parts, making re-assembly troublesome. The present invention seeks to overcome these problems.

According to a first embodiment of the invention, there is provided a dip cup comprising a cup for receiving a teat, the cup being connected or connectable to a supply of teat treating liquid including a foaming agent, one or more foaming elements for mixing air and the teat treating liquid to produce foam, and at least one regulator device for setting an air-to-liquid ratio, the at least one regulator device being selectable or adjustable based on the teat treating liquid so that a specified air-to-liquid ratio is achieved, wherein the at least one regulator device comprises a transport conduit for the teat treating liquid, and one or more air passages; further wherein the one or more air passages are open-ended and are arranged circumferentially around the external surface of the liquid transport conduit. Moreover, the one or more air passages are uniformly rectilinear with a longitudinal extent that is substantially parallel with the longitudinal axis of the transport conduit.

Preferably the one or more air passages are defined by channels formed in the regulator device, which cooperate with the external surface of the liquid transport conduit. Further preferably, the air flow passages that are defined by the channels formed in the regulator device cooperate with the external surface of the liquid transport conduit in an interference push fit manner with the external surface of the liquid transport conduit. The or each regulator device may be removable.

Highly advantageously, the or each air passage is selectable or adjustable to vary a volume flow rate of air through the at least one regulator device and especially preferred, the regulator device comprises a regulator body with a planar upper surface; the one or more air passages break out onto said planar upper surface and are provided radially in the planar upper surface. The one or more foaming elements include one or more mesh elements at or adjacent to the at least one regulator device and at which the foam is produced. It is possible for the foaming elements to be provided in the base of the cup, in addition the foaming elements may be positioned up stream of the at least one regulator device. The at least one regulator device is provided in the base of the cup and the regulator may be engagable with the cup. The teat treating liquid may be held in a compressible container that may be connected or connectable to the cup, alternatively, the teat treating liquid may be supplied via a remote source that is linked directly or indirectly to the cup and the liquid is urged towards and into the cup with the aid of a pump or other urging device.

According to a second aspect of the invention, there is provided a dip cup in accordance with the first aspect of the invention, in combination with a teat treating liquid including a foaming agent, the at least one regulator device being selectable or adjustable based on the teat treating liquid so that a predetermined air-to-liquid ratio is achieved.

Further preferable and/or optional features of the invention are set forth in claims 3 to 16, inclusive.

The present invention will now be more particularly described, by way of example only, with reference to the accompanying drawings, in which.

Figure 1:
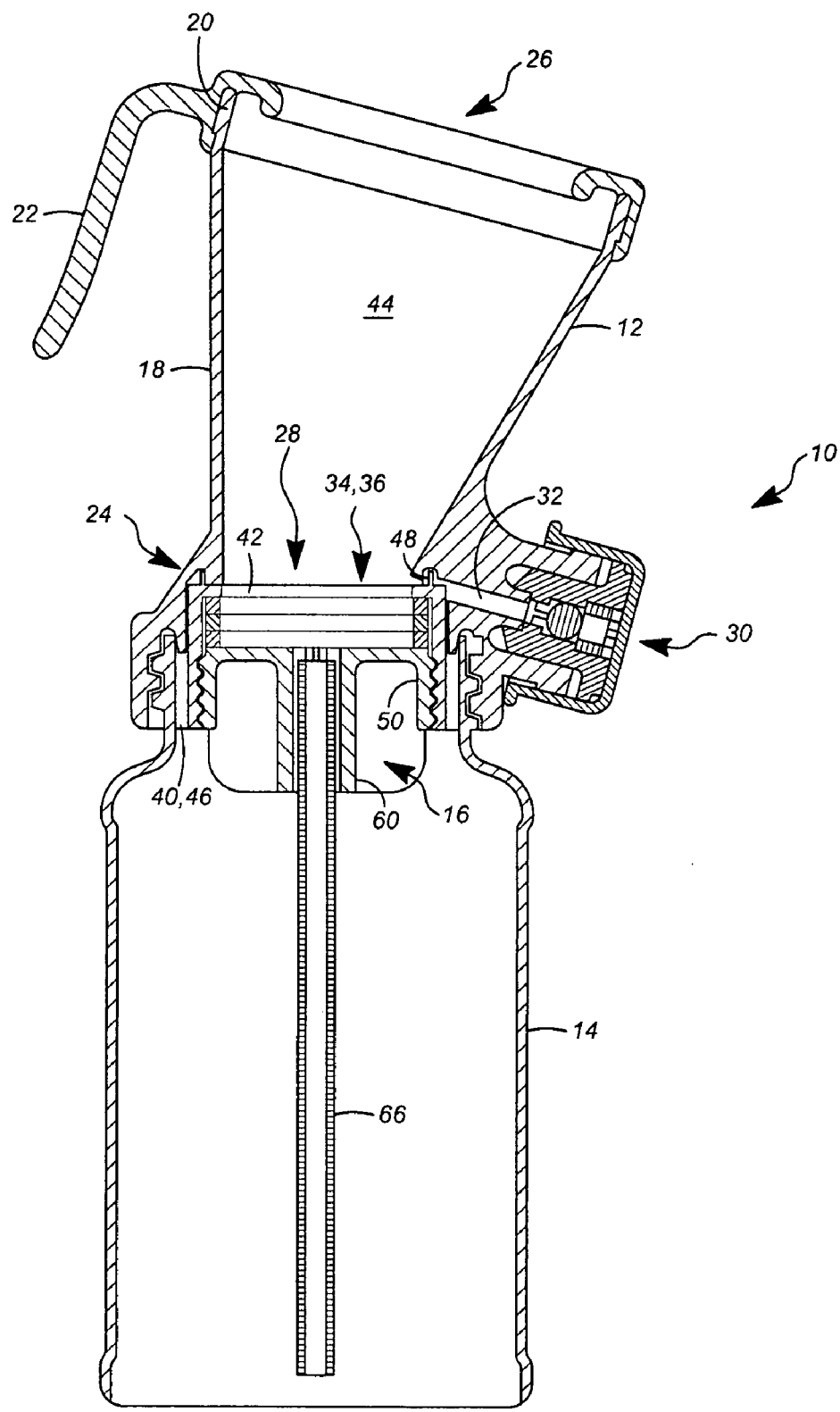
FIG. 1 is a cross-sectional view of a dip cup, in accordance with the first aspect of the present invention.
Figure 3:
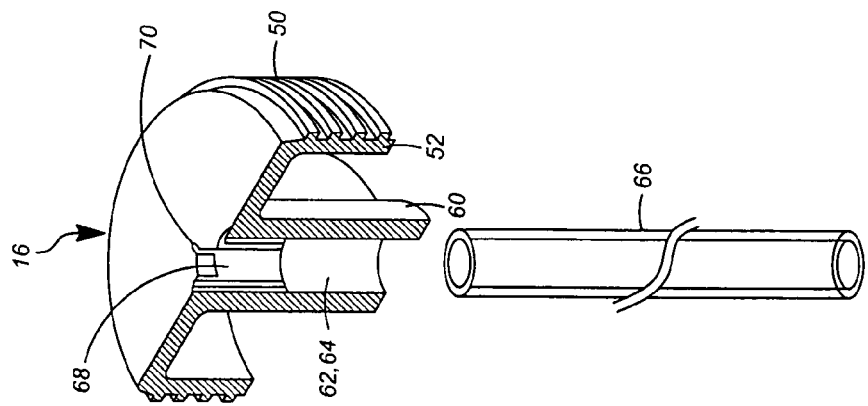
FIG. 3 is a cross-sectional view of the removable regulator, with liquid conduit removed.
Figure 2:
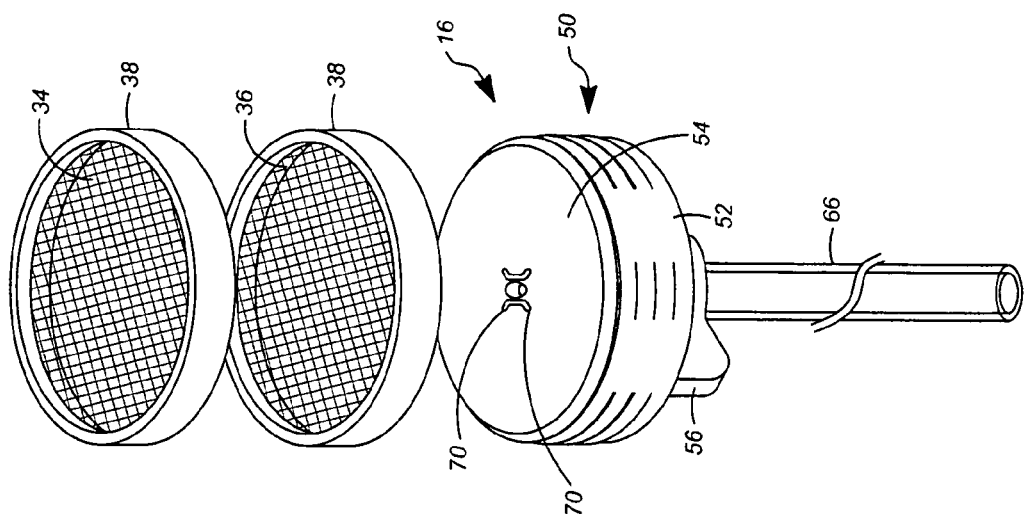
FIG. 2 is a perspective view of the regulator device provided by a removable regulator and the foaming elements of the dip cup shown in FIG. 1, when removed.
Figure 4:
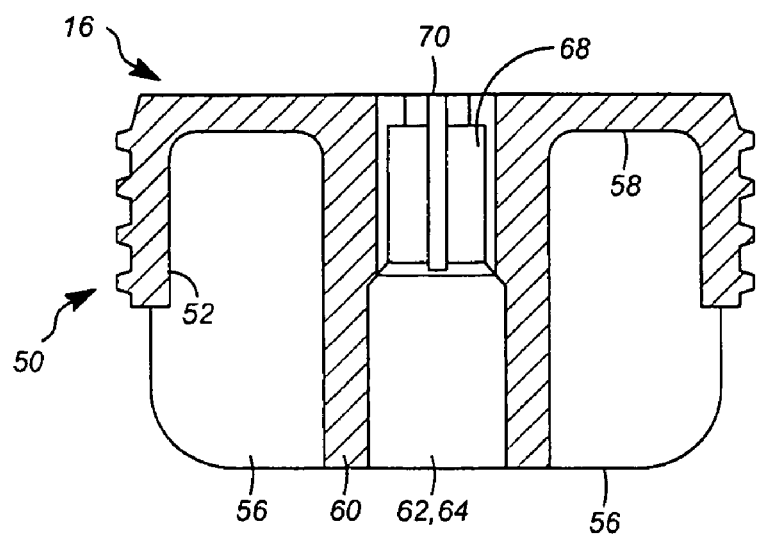
FIG. 4 is an elevation cross-sectional view of the regulator.
Figure 5:
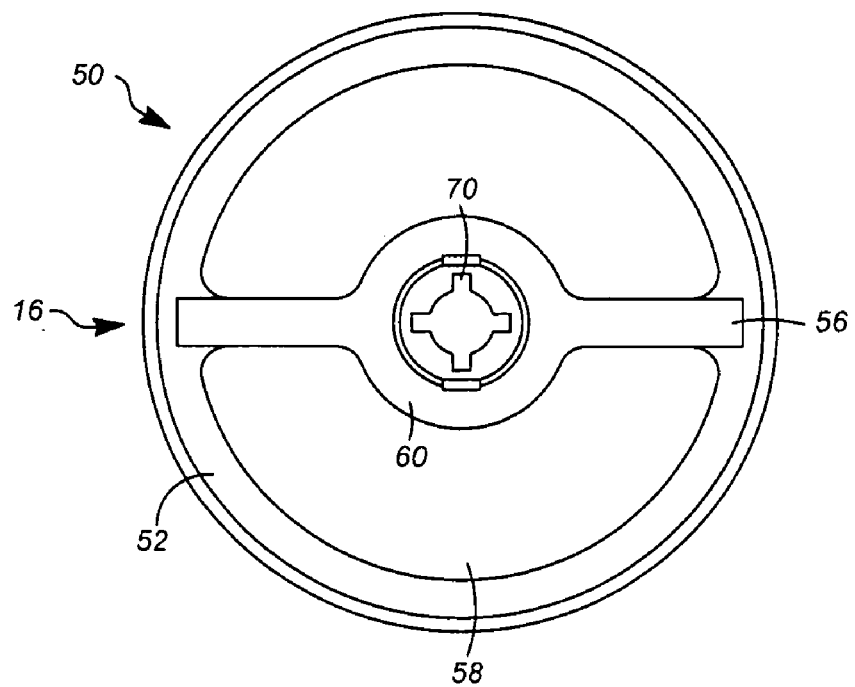
FIG. 5 is a plan view from below of the regulator.

Referring now to FIGS. 1 to 5, there is shown a dip cup 10, which comprises a cup 12, a compressible container 14 which is screw-threadingly disengagably connectable to a base of the dip cup 10, foaming elements for mixing air and teat-treating liquid to produce foam, and a regulator device provided by a removable regulator 16 for setting an air-to-liquid ratio.

The cup 12 is of similar shape to the known cup, and generally comprises an inverted frusto-conical body 18 with a cylindrical upper edge 20, an optional handle 22 which is attached or attachable to or adjacent to the cylindrical upper edge 20, and a screw-threaded base 24 for engaging the compressible container 14. The cylindrical upper edge 20 defines a teat opening 26 for accepting a teat to be cleaned, and the base 24 includes a base opening 28 for accepting the regulator 16 and foaming elements. The teat opening 26 has a larger diameter or dimension than that of the base opening 28.

Although the base opening 28 is formed in the base 24 of the cup 12, the opening can be provided in a side of the cup such that the regulator and/or the foaming elements are located in or on a side of the cup.

A one-way air-valve 30 is provided on a side of the cup 12, and an air conduit 32 is formed in the cup 12 from the air-valve 30 to admit air to the compressible container 14. The air-valve 30 can include a filter for filtering detritus and particulate matter. The air filter can be removable for cleaning and/or disposable.

The compressible container 14 is typically formed from moulded plastics material, and is sufficient to hold a reasonable volume of teat-treating liquid. The teat-treating liquid includes a foaming agent.

The foaming elements are in the form of two planar meshes 34, 36 of matching diameter. Each mesh 34, 36 is connected to a cylindrical supporting ring 38.

An axial depth of each supporting ring 38 is sufficient to space the meshes 34, 36 from each other by a predetermined distance when the two supporting rings 38 are coaxially superposed. The predetermined distance between the meshes 34, 36 dictates the quality of the foam generated during use. The base opening 28 in the cup 12 includes a stepped bore 40 defining a first bore portion 42 adjacent to the interior 44 of the cup 12 and a second bore portion 46 which has a larger diameter than the first bore portion 42. The first bore portion 42 of the base opening 28 is dimensioned to flushly receive the stacked mesh supporting rings 38. A stop 48 is provided in or at the base opening 28 to prevent the rings 38 from entering the interior 44 of the body 18 of the cup 12.

Although two meshes 34, 36 are suggested, a single mesh or more than two meshes can be used. Also, the two or more meshes need not be of identical diameter.

The or each mesh can be a single thin or thick layer of woven or non-woven material, or interconnected or interwoven multi-layers of woven or non-woven material. The or each mesh maybe pad-like, sponge-like, or an open-weave disk or block.

Furthermore, although two rings 38 are utilised, the two meshes 34, 36 can be supported in fixed spaced relationship by a single ring.

The removable regulator 16 is typically formed from moulded plastics material, and comprises a generally cylindrical regulator body 50 having a screw-thread formed on an exterior depending skirt 52 thereof, and a planar upper surface 54. Integrally formed finger engagement tabs 56 project from a lower surface 58 of the regulator body 50 to aid screw-threaded engagement and removal of the regulator 16, and a spigot 60 is centrally formed to project from the lower surface 58 of the regulator body 50.

The spigot 60 includes a stepped through-bore 62. A first larger-diameter bore portion 64 of interference push-fit, a liquid transport conduit 66 which projects from the regulator body 50 and into the teat treating liquid provided in the compressible container 14.

A second smaller-diameter bore portion 68 of the spigot 60 breaks out onto the planar upper surface 54, and includes one or more open-ended air-channels 70 along its longitudinal extent. The or each air-channel 70 is uniformly rectilinear with a longitudinal extent which is parallel or substantially parallel with an axis of the stepped through-bore 62. A lateral cross-sectional shape of each air-channel 70 is or is substantially U-shaped.

In the case of a plurality of air-channels 70, each air-channel has identical dimensions and is equi-angularly spaced from the adjacent air-channels.

As long as air can be entrained with the teat-treating liquid, the positioning of the or each air-channel 70 is relatively free. For example, although provided within the spigot 60, one or more air-channels could be provided radially in the upper surface 54 of the regulator body 50, and/or provided through the regulator body 50 and spaced from the spigot 60. Alternatively or additionally, one or more air-channels could be provided through the wall of the spigot 60, for example, transversely to the longitudinal extent of the spigot 60.

The second bore portion 46 of the base opening 28 of the cup 12 includes a mating screw-thread for accepting the regulator body 50. With the meshes 34, 36 in place, the regulator 16 is releasably screw-threadingly engaged with the cup 12 in the base opening 28, thus trapping the meshes 34, 36 in place. With the liquid transport conduit 66 located in the spigot 60 of the regulator 16, the compressible container 14 with teat-treating liquid and foaming agent is screw-threadingly engaged with the cup 12 at its base 24.

In use, the compressible container 14 is squeezed one or more times by a user's hand to force teat-treating liquid along the liquid transport conduit 66 and into the spigot 60 of the regulator 16. At the same time, a proportion of the air is forced from the compressible container 14, along the or each air-channel 70, and entrained with the liquid adjacent to face 54 of regulator 16.

The teat-treating liquid and entrained air is then forced through the spaced meshes 34, 36 of the foaming elements, causing mixing and thus foam to be dispensed into the interior 44 of the cup 12.

Since it is essential that a correct air-to-liquid ratio is provided, the dimensions of the or each air-channel 70 and/or a number of air-channels 70 are set to correspond to the kind or brand of teat-treating liquid being used. The regulator 16 utilised is thus selected based on the teat-treating liquid, to ensure the correct air-to-liquid ratio. For example, it is envisaged that a correct regulator 16 is supplied when purchasing the teat-treating liquid, and that a user inserts the regulator 16 into their dip cup 10 before use.

An alternative is that a plurality of regulators 16 having one or more air-channels 70 of differing dimensions and/or a varying number of air-channels 70 is provided, and that a user selects the appropriate regulator 16 to be used with their particular teat-treating liquid.

In a modification to the above-described embodiment, the regulator is provided with an adjustment mechanism for altering a dimension of the or each air-channel, and thus an air-volume flow rate. The adjustment mechanism can be an angularly displaceable air-volume adjustment disk or cap mounted for rotation in or on the regulator body and which, when turned, partially closes or further opens the or each air-channel.

Alternatively, the air-volume adjustment disk or cap, when rotated, can close one or more air-channels having a first dimension whilst opening one or more further air-channels having a second different dimension.

A further modification is envisaged in that the second bore portion of the spigot can be an adaptor which is removable from the regulator body. As such, an adaptor is selected having the appropriately dimensioned air-channel or air-channels for the chosen teat-treating liquid.

The selected adaptor is then push-fit inserted into the spigot, and the regulator is screw threadingly engaged with the cup in the normal manner.

Figure 6:
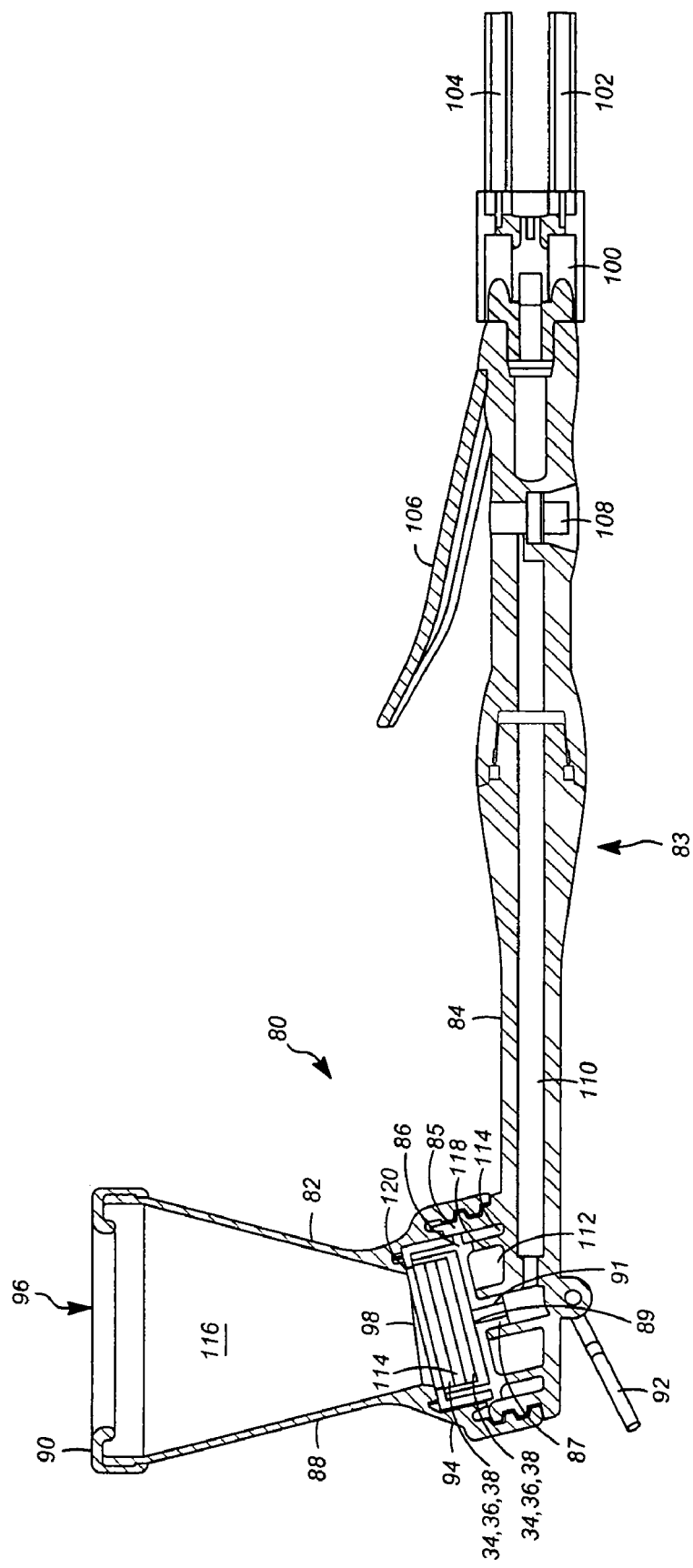
FIG. 6 is a cross sectional view of a further embodiment of a dip cup of the present invention.

Although a directly mounted compressible container is suggested as being suitable for supplying the teat-treating liquid, a remote container of the teat-treating liquid with foaming agent can be utilised instead. In this case, the compressible container is dispensed with, and the cup is connected to a liquid supply line, either directly or, for example, through a hand operable lance; such an apparatus is illustrated in FIG. 6. A device, such as a compressor or a pump, is provided for moving the teat-treating liquid on-demand from the remote container to the cup. In this case, air can be supplied separately from a second supply and entrained within the teat treating liquid. At least one regulator device is provided to ensure that the respective pressures of the air and the teat treating liquid are at the correct levels so that an appropriate ratio of air to teat treating liquid is used.

Looking at FIG. 6 in more detail, there is shown dip cup apparatus 80, which comprises a cup 82, which is of similar shape to cup 12, and likewise comprises an inverted frusto-conical body 88 with a cylindrical upper edge 90. The cup 82 also has a screw-threaded base 94 that is disengagably attached or attachable to or adjacent to a correspondingly screw-threaded head portion 85 of a lance 83, and foaming elements for mixing air and teat-treating liquid to produce foam. The foaming elements are used in this embodiment of the present invention to optimize the quality of foam, and are identical to the foaming elements described above as items 34, 36. An optional hook 92, is provided at or near the head portion 85 of the lance 83, to enable the dip cup apparatus 80 to be hung up when not in use. The cylindrical upper edge 90 of the cup 82 defines a teat opening 96 for accepting a teat to be cleaned, and the base 94 of the cup 82 includes a base opening 98 for accepting the head portion 85 of the lance 83 and foaming elements. The teat opening 96 has a larger diameter or dimension than that of the base opening 98.

The lance 83 is a wand-like component that comprises a manually operable elongate handle portion 84, which, as described above, has a head portion 85 at one end for screw-threadingly releaseably engaging with the correspondingly screw-threaded base 94 of the cup 82. The other end of the elongate handle portion 84 is provided with a teat-treating liquid/air mixing chamber 100 which in turn is provided with two transport conduits 102, 104, one of which supplies a source of teat-treating liquid including a foaming agent and the other supplies a source of pressurized air. The pressurized air may be conveyed along the transport conduit using several alternative methods such as using a compressor, a gas cylinder or delivered using a peristaltic pump or other known device. The teat-treating liquid including a foaming agent may be conveyed along the other transport conduit using, for example, a vacuum operated pump, a peristaltic pump, a stirrup pump, compressed air or some other apparatus. The ratio of pressurized air-to-liquid is adjusted so that it is appropriate for the particular teat-treating liquid being used, and this may be achieved using at least one adjustable regulator device, not shown in FIG. 6. Conveniently, the at least one adjustable regulator device is associated with at least one of the source of pressurized air and/or the source of teat-treating liquid. A filter, also not shown in FIG. 6, is provided within the elongate handle 84 of the lance 83, for filtering detritus and particulate matter. The filter can be removable for cleaning and/or disposable. The lance 83 is also provided with a manually operable lever 106 that is capable of being pressed to open a valve 108. The interior of the elongate handle 84 of the lance 83 is hollow to provide fluid flow path 110 that extends between the mixing chamber 100 and an aperture 87 located at the centre of the head portion 85. Concentric around the central aperture 87 is provided a first bore portion 112 and a second bore portion 114 which has a larger diameter than the first bore portion 112. An up stand 118 in the head portion 85 divides the first and second bore portions 112 and 114.

The foaming elements used in this embodiment of the invention comprise two planar meshes 34, 36 that are identical to those described above. As described in relation to the dip cup of the first embodiment, two meshes 34, 36 are suggested, but a single mesh or more than two meshes can be used. Again, the or each mesh can be a single thin or thick layer of woven or non-woven material, or interconnected or inter-woven multi-layers of woven or non-woven material. The or each mesh maybe pad-like, sponge-like, or an open-weave disk or block. In addition, although two rings 38 are utilised, the two meshes 34, 36 can be supported in fixed spaced relationship by a single ring. A cup-shaped mesh housing 86 is provided to receive the stacked mesh supporting rings 38. A small aperture 89 is formed in the centre of the base of the cup-shaped mesh housing 86, and a spigot 91, which is aligned with the aperture 89, protrudes from the underside of said base. The cup shaped mesh housing 86 is positioned within the head portion 85 of the lance 83 such that the underside of the base of 86 rests on the top of the up stand 118 and the spigot 91 is fitted into, as an interference push-fit, the aperture 87 in the head portion 85 of the lance 83. A stop 120 is provided in or at the base opening 98 to prevent the rings 38 from entering the interior 116 of the body 88 of the cup 82.

In use, the cup 82 is screw-threadingly attached to the head portion 85 of the lance 83, thereby trapping the rings 38 within the mesh housing 86 between the head portion 85 and the stop 120. To operate the dip cup apparatus 80, the lever 106 is pressed down by the user's hand to open the valve 108 and thereby to admit the mixture of teat-treating liquid and pressurized air from the mixing chamber 100 into the flow path 110 formed within the handle 84, out of the aperture 87 in the head portion 85, through the spigot 91 and into the mesh housing 86. The teat-treating liquid and entrained air is then forced through the spaced meshes 34,36 of the foaming elements, causing further mixing and thus foam to be dispensed into the interior 116 of the cup 82.

As the embodiments of the invention demonstrate, it is possible to provide a dip cup with at least one regulator device, which is selectable or adjustable based on the teat-treating liquid being used, so that a specified air-to-liquid ratio is achieved. It is also possible to provide a dip cup that is simple in construction, and with few parts, making for easy dismantling and cleaning.

The embodiments described above are given by way of examples only, and various other modifications will be apparent to persons skilled in the art without departing from the scope of the invention, as defined by the appended claims.

The invention claimed is:

1. A dip cup comprising:
   a cup for receiving a teat, the cup being connected or connectable to a supply of teat treating liquid including a foaming agent,
   more than one foaming element for mixing air and the teat treating liquid to produce a desired foam bubble size, and
   at least one regulator device for setting desired air-to-liquid ratio, the at least one regulator device being selectable or adjustable based on the teat treating liquid so that a specified air to-liquid ratio is achieved, wherein the at least one regulator device comprises:
   a liquid supporting surface;
   a transport conduit for transporting the teat treating liquid to said liquid supporting surface; and
   one or more air passages through said liquid supporting surface, wherein the one or more air passages are open-ended and are arranged circumferentially around the transport conduit and when air passes through said air passages foam is created when said air passes through said liquid on said liquid supporting surface.

2. A dip cup according to claim 1, further wherein the one or more air passages are uniformly rectilinear with a longitudinal extent that is substantially parallel with the longitudinal axis of the liquid transport conduit.

3. A dip cup according to claim 1, wherein the one or more air passages are defined by channels formed in the regulator device which cooperate with the external surface of the liquid transport conduit.

4. A dip cup according to claim 1, wherein the one or more air passages are defined by channels formed in the regulator device which cooperate in an interference push fit manner with the external surface of the liquid transport conduit.

5. A dip cup according to claim 1, wherein the at least one regulator device is removable.

6. A dip cup as claimed in claim 1, wherein the at least one regulator device is selectable from amongst a plurality of different regulators.

7. A dip cup as claimed in claim 1, wherein the or each air passage is selectable or adjustable to vary a volume flow rate of air through the at least one regulator device.

8. A dip cup according to claim 1, wherein the regulator device comprises a regulator body with a planar upper surface, and further wherein the one or more air passages break out onto said planar upper surface and are provided radially in said planar upper surface.

9. A dip cup as claimed in claim 1, wherein the more than one foaming element comprises more than one mesh elements at or adjacent to the at least one regulator device and at which the foam is produced.

10. A dip cup as claimed in claim 1, wherein the at least one regulator device is provided in a base of the cup.

11. A dip cup as claimed in claim 1, wherein the more than one foaming element are provided in a base of the cup.

12. A dip cup as claimed in claim 1, wherein in use the more than one foaming element are positioned upstream of the at least one regulator device.

13. A dip cup as claimed in claim 1, wherein the at least one regulator device is engagable with the cup.

14. A dip cup as claimed in claim 1, further comprising a compressible container for holding the teat treating liquid and which is connected or connectable to the cup.

15. A dip cup as claimed in claim 1, further comprising a remote container for holding the teat treating liquid, a liquid supply line which directly or indirectly connects the container and the cup, and a pump for urging the teat treating liquid in the container along the fluid flow path to the cup.

16. A dip cup as claimed in claim 1, in combination with a teat-treating liquid including a foaming agent, the at least one regulator device being selectable or adjustable based on the teat treating liquid so that a predetermined air-to-liquid ratio is achieved.

17. A dip cup as claimed in claim 9, wherein the more than one foaming element is of matching diameter and are coaxially superposed and spaced one from another.

* * * * *